(12) United States Patent
Walbrecker et al.

(10) Patent No.: US 12,346,281 B2
(45) Date of Patent: Jul. 1, 2025

(54) METHOD FOR OPERATING A FIELD DEVICE OF PROCESS MEASUREMENT TECHNOLOGY AND FILLING SYSTEM WITH WHICH THE METHOD IS CARRIED OUT

(71) Applicant: KROHNE Messtechnik GmbH, Duisburg (DE)

(72) Inventors: Sven Walbrecker, Wesel (DE); Dirk Kuschnerus, Krefeld (DE); Hansjörg Mucke, Mönchengladbach (DE); Martin Krawczyk-Becker, Herne (DE)

( * ) Notice: Subject to any disclaimer, the term of this patent is extended or adjusted under 35 U.S.C. 154(b) by 64 days.

(21) Appl. No.: 18/421,650

(22) Filed: Jan. 24, 2024

(65) Prior Publication Data

US 2024/0248867 A1    Jul. 25, 2024

(30) Foreign Application Priority Data

Jan. 24, 2023   (DE) .......................... 102023101668.7

(51) Int. Cl.
*G06F 13/40*     (2006.01)
*G06N 3/091*     (2023.01)

(52) U.S. Cl.
CPC ......... *G06F 13/4068* (2013.01); *G06N 3/091* (2023.01)

(58) Field of Classification Search
None
See application file for complete search history.

(56) References Cited

U.S. PATENT DOCUMENTS

| | | | |
|---|---|---|---|
| 2005/0197803 A1* | 9/2005 | Eryurek | G05B 23/0289 702/185 |
| 2013/0203359 A1* | 8/2013 | Seiler | G05B 19/0428 455/67.11 |
| 2016/0147695 A1* | 5/2016 | Kroner | H04L 41/0803 710/306 |
| 2022/0229423 A1 | 7/2022 | Naser et al. | |
| 2024/0248867 A1* | 7/2024 | Walbrecker | G06N 5/025 |

FOREIGN PATENT DOCUMENTS

| | | |
|---|---|---|
| DE | 102007027276 A1 | 6/2007 |
| DE | 102015121178 A1 | 12/2015 |
| KR | 101875341 B1 | 7/2018 |

* cited by examiner

*Primary Examiner* — Hyun Nam
(74) *Attorney, Agent, or Firm* — Patrick D. Duplessis (57) ABSTRACT

A method for operating a field device for process measurement technology includes: capturing and storing fieldbus messages in a learning mode; in a plurality of capture steps, at least partially storing the captured and stored fieldbus messages as a learning data set in each case if a status rule of the field device is fulfilled, so that a plurality of learning data sets are captured; in an evaluation step, evaluating a plurality of learning data sets to derive a message rule dependent on at least one fieldbus message for changing from normal mode of the field device to diagnostic mode of the field device; and applying, by the field device, the message rule for changing from the normal mode of the field device to the diagnostic mode of the field device instead of or in addition to the status rule.

12 Claims, 6 Drawing Sheets

METHOD FOR OPERATING A FIELD DEVICE OF PROCESS MEASUREMENT TECHNOLOGY AND FILLING SYSTEM WITH WHICH THE METHOD IS CARRIED OUT

TECHNICAL FIELD

The invention relates to a method for operating a field device of process measurement technology, wherein the field device is in communication connection with at least one other bus subscriber via a field bus for transmitting field bus messages, wherein at least one status rule for changing from normal operation of the field device to a diagnostic mode of the field device is provided to the field device when the status rule is fulfilled, wherein the status rule depends on at least one status variable of the field device known to the field device. In addition, the invention also relates to a filling system with a first filling point and with at least one second filling point, wherein the first filling point has at least one first filling valve, at least one first flow or fill level sensor and at least one first control and evaluation unit for controlling and monitoring the filling process of the first filling point and wherein the second filling point has at least one second filling valve, at least one second flow or fill level sensor and at least one second control and evaluation unit for controlling and monitoring the filling process of the second filling point, wherein the first filling valve, the first flow or fill level sensor, the second filling valve and the second flow or fill level sensor are in communication with each other via a field bus, wherein at least the first control and evaluation unit is provided by a status rule for changing from a normal mode of the first flow or fill level sensor to a diagnostic mode of the first flow or fill level sensor when the status rule is fulfilled, wherein the status rule depends on at least one status variable of the first flow or fill level sensor known to the first flow or fill level sensor.

BACKGROUND

Field devices for process measurement technology are usually installed "in the field", i.e. in an industrial environment such as an automation and/or process technology system. Field devices with a measuring task can be, for example, flow, fill level, pressure, temperature or pH measuring devices. Field devices can also be designed as actuators, for example as control valves, linear drives based on various technologies (electric, hydraulic, pneumatic), stepper motors, etc.

In many process engineering systems, field devices from both categories are used together, for example to implement process control procedures. A good example of the joint use of such field devices are filling systems in which defined filling quantities of a medium are filled into containers provided for this purpose. The filling points of a filling system usually each have a filling valve and a flow or fill level sensor, wherein the filling valve can be used to actively influence the filling quantity and wherein the flow or fill level sensor monitors the filling process by measuring it.

Many of the field devices used in process measurement technology not only have a normal mode, which represents the "normal" operating state of the field device—i.e. the measuring mode in the case of a field device operating as a measuring device—but also a diagnostic mode, which—as the name suggests—is used to diagnose the field device, i.e. in which the field device is checked to ensure that it is functioning correctly. This is necessary to ensure reliable operation of the process, for example in the form of the aforementioned filling system in which the field device is integrated. The diagnostics can vary greatly from field device to field device and from implemented measuring principle to measuring principle. Known diagnostics are, for example, zero point monitoring, which is used in many measuring concepts, electrical conductivity monitoring or—for example when using magnetic-inductive flowmeters—monitoring of the electrode noise of the measuring electrodes. The type of diagnosis and the exact diagnostic process are not important here.

Diagnostic modes can often only be performed sensibly if the field device is in a suitable state. This applies, for example, to zero point monitoring, which checks whether, for example, an actual zero flow is also measured as zero flow in a flowmeter. Another example is conductivity monitoring for magnetic-inductive flowmeters, for which at least a low flow rate must be present. Another example with magnetic-inductive flowmeters is the monitoring of electrode noise.

To ensure that diagnostic mode is only performed when the field device is in a suitable state, a corresponding status rule is specified in the field device and its fulfillment is checked. If the status rule is fulfilled, the field device switches from normal mode to diagnostic mode in order to perform the corresponding diagnostics. The status rule depends on at least one status variable of the field device known to the field device. In the example of zero point monitoring, the status variable of the field device is the primary measured variable determined by the field device itself, i.e. the flow rate in the case of a flowmeter. However, other state variables can also play a role, such as a temperature captured by the field device—for example, the temperature of the medium flowing through a flowmeter—, the rate of change of a measured variable, etc.

The use of diagnostics triggered by evaluating a status rule can be relatively time-consuming because the relevant status variables have to be captured and evaluated, especially if the status variables are not actually of interest during normal operation. If a state variable can no longer be captured correctly, a diagnostic mode may no longer be achieved independently by the field device, which is obviously problematic.

SUMMARY

The object of the present invention is therefore to further develop the method described above for operating a field device for process measurement technology in such a way that the aforementioned disadvantages are at least partially avoided.

The object derived above is achieved in the method described at the beginning by capturing and storing at least some of the fieldbus messages in a learning mode. The field device is connected to at least one other bus subscriber via a field bus. Typically, a large number of field devices are connected to each other via a fieldbus, in particular field devices that are used in a connected process. The fieldbus messages exchanged via the fieldbus can, in principle, be captured by all bus participants, even if the fieldbus messages are only addressed to a determined bus subscriber of all connected bus subscribers. In the aforementioned learning mode, at least some of the fieldbus messages are captured and stored. By capturing and storing at least some of the fieldbus messages in learning mode, it is therefore possible to look back into the past of the fieldbus communication, and past fieldbus messages that have been transmitted via the fieldbus are thus available.

In a plurality of capture steps, if the status rule is fulfilled, the captured and stored fieldbus messages are at least partially stored as a learning data set, so that a plurality of such learning data sets with fieldbus messages are captured, wherein the fieldbus messages preceded the fulfillment of the status rule.

In an evaluation step, a message rule dependent on at least one fieldbus message for switching from normal mode of the field device to diagnostic mode of the field device is derived by evaluating several learning data sets. The fieldbus message does not necessarily have to be a fieldbus message addressed to the field device. In any case, it is a fieldbus message that has been captured in learning mode and has found its way into the learning data sets. The message rule for switching from normal mode to diagnostic mode of the field device is generally derived by examining the fieldbus messages of the learning data sets for possible similarities that are associated with the triggering of diagnostic mode or the fulfillment of the status rule.

The field device then applies the message rule for switching from normal mode of the field device to diagnostic mode of the field device instead of or in addition to the status rule. If the field device evaluates the message rule instead of the status rule, there is no longer any need for the field device to capture the status variables otherwise required to evaluate the status rule. This may therefore save on technical equipment, for example in the form of sensors for capturing the status variables, or in the form of computing capacity of the computing unit usually installed in each field device. The method also prevents diagnostic mode from no longer being reliably achieved due to incorrectly captured status variables. When performing the status rule and the message rule at the same time, it is possible to check the plausibility or consistency of the results of both methods. For example, conclusions can be drawn about incorrect capture of status variables.

In a preferred version of the method, the fieldbus messages are captured by the field device in learning mode and the capture steps and the evaluation step are performed on the field device. This method variant is designed so that each field device can be individually adapted to replace the status rule with a corresponding message rule, allowing individual features of the field device or its installation situation to be taken into account. In particular, no additional technical equipment is required. This method is advantageous for field devices that have powerful hardware equipment and adequate computing power to perform the method.

In an alternative design of the method, on the other hand, it is provided that the fieldbus messages are captured by a service bus subscriber in learning mode and the capture steps and the evaluation step are performed on the service bus subscriber, wherein the field device evaluates the status rule and informs the service bus subscriber that the status rule has been fulfilled. Preferably, the notification of the fulfillment of the status rule is done by means of a fieldbus message. This makes it possible to perform the learning mode for obtaining the message rule on a suitable, sufficiently powerful bus subscriber that has a computing capacity that clearly exceeds the performance of a normal process measurement technology field device. Preferably, the service bus subscriber transmits the message rule derived from it to the corresponding field device, wherein the message rule is then applied to the receiving field device. In a preferred design of the method, the message rule is also transmitted to other field devices that are in an identical application situation with an identical status rule.

Another preferred design of the method provides for the message rule to be derived from the learning data sets on the basis of a regression analysis with the various bus messages as independent variables and the fulfillment of the status rule as the dependent variable. The regression analysis is suitable for establishing relationships between the dependent and independent variables. The method identifies correlations and models them using the resulting regression relationship. In a preferred design of this method variation, it is provided that the bus messages with the smallest partial correlation in the fulfillment of the status rule are gradually, i.e. sequentially, excluded until only a predetermined number of independent variables are part of the message rule. This allows the message rule to be considerably simplified. It should be noted that the correlations do not necessarily reflect causality.

In a preferred design of the method, it is therefore provided that random learning data sets are stored that are not related to the fulfillment of the status rule. The random learning data sets are therefore not linked in time to the fulfillment of the status rule. The random learning data sets are then also used to derive a message rule based on a regression analysis. If the message rule derived from the random learning data sets is identical to the message rule obtained from the regular learning data sets, or if the message rule derived from the random learning data sets is dependent on the same fieldbus messages as independent variables to a predetermined percentage, the message rule derived using the regular learning data sets is discarded. This prevents fieldbus messages that are not related to the fulfillment of the status rule from being inadmissibly taken into account. This can apply, for example, to bus messages that are transmitted periodically, in particular at high frequency to the fieldbus.

In an alternative further development of the method, it is provided that the message rule is derived from the learning data sets on the basis of the training of an artificial neural network, with at least some of the bus messages of the learning data sets as input variables and the fulfillment of the status rule as output variable. It is particularly preferred that the relative time of occurrence of the respective bus message is also used at least partially as an input variable. Preferably, the relative time of occurrence of the bus message in relation to the time of fulfillment of the status rule is used as the relative time. This also allows a chronological sequence of certain bus messages to be taken into account.

Another further development of the method is characterized in that in the capture steps, fieldbus messages that were not addressed to the field device itself are stored in a learning data set. In a filling system, for example, these could be messages that have been sent by filling valves—including neighboring filling points. This ensures that the message rule is based on a networked information base that is independent of the field device in question.

The described object is also achieved in the filling system described at the beginning with a first filling point and with at least one second filling point in that, according to one variation, the control and evaluation unit of at least the first filling point is designed in such a way that the control and evaluation unit performs the method described above during operation. According to another variation, it is provided that a service bus subscriber is connected to the first filling valve and the first flow or fill level sensor of the first filling point and to the second filling valve and the second flow or fill level sensor of the second filling point via the field bus and the filling system performs a method as described above in connection with the service bus subscriber.

The filling system is a highly networked system with a number of identical sub-units, namely the filling points. The method can therefore be performed particularly effectively here.

BRIEF DESCRIPTION OF THE DRAWINGS

In detail, there are now a large number of possibilities for designing and further developing the claimed method and also the claimed filling system. Reference is made to the following description of embodiments in conjunction with the drawings.

DETAILED DESCRIPTION

Figure 1:
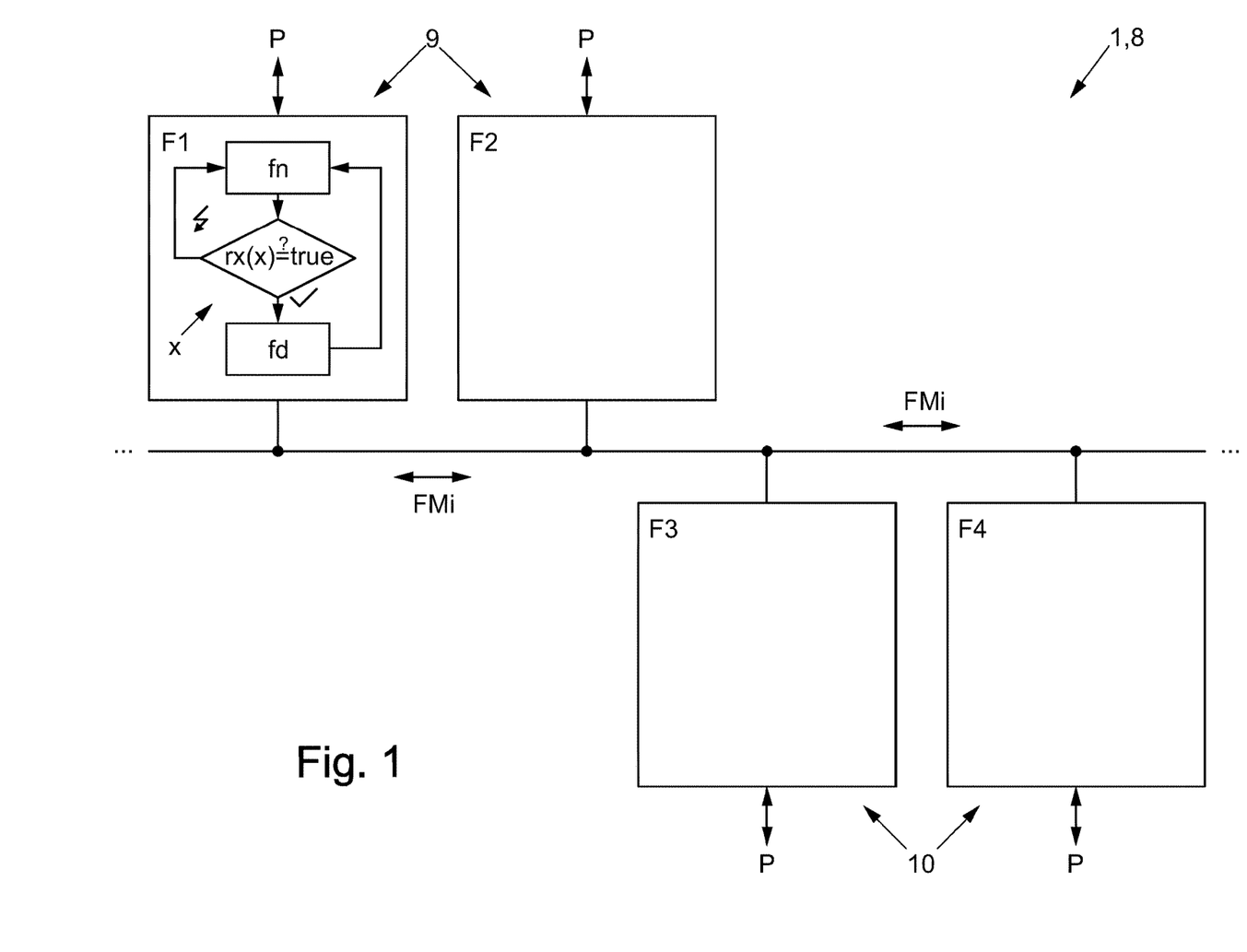
FIG. 1 illustrates a method known from the prior art for operating a field device of process measurement technology, in which the diagnostic mode is triggered by checking a status rule, and a corresponding filling system on which the method is operated.

FIG. 1 shows a method 1 known from the prior art for operating a field device F1 of process measurement technology, wherein the field device F1 is in communication with at least one other bus subscriber F2, F3, F4 via a field bus 2 for transmitting field bus messages FMi. Serial networking of the field device F1 with the other bus subscribers F2, F3, F4, which are also field devices in the embodiments shown, is implemented via the field bus 2. In the case of the fieldbus messages FMi, it is initially not important to distinguish which bus device F has sent the fieldbus message FMi and which bus device F receives the bus message FMi; in this respect, the identifier "FMi" refers to an unspecific fieldbus message or the entirety of the fieldbus messages FMi transmitted via the fieldbus 2.

In the present case, the field device F1 is a flowmeter. In normal operation fn of the field device F1, the field device F1 performs its intended purpose, i.e. flow measurements in measurement mode.

A status rule rx for changing from normal mode fn of the field device F1 to a diagnostic mode fd of the field device F1 is provided to the field device F1, wherein the change from normal mode fn to diagnostic mode fd occurs when (rx(x)=! true) of the status rule rx is fulfilled.

The diagnostic mode fd is generally used to monitor various functional aspects of the field device F1. The status rule rx depends on at least one status variable x known to the field device F1. The status variable x can be its own measured variable, but also other parameters relevant to the operation of the field device F1, such as the device temperature, a pressure in the device compartment, rates of change of the measured variable, the operating time, etc. In order to be able to check the status rule rx, i.e. to check whether rx(x)=? true, one or more status variables x must of course be captured, which is time-consuming. In addition, there is a risk that the evaluation of the status rule rx will provide incorrect results if the status variable x is captured incorrectly.

FIGS. 2 to 6 now show various aspects of the method 1 according to the invention, which is used to derive a message rule fn based on the evaluation of fieldbus messages FMi, the evaluation of which—depending on the result of the evaluation—can then be used to transfer the field device from normal mode fn to diagnostic mode fd.

Figure 2:
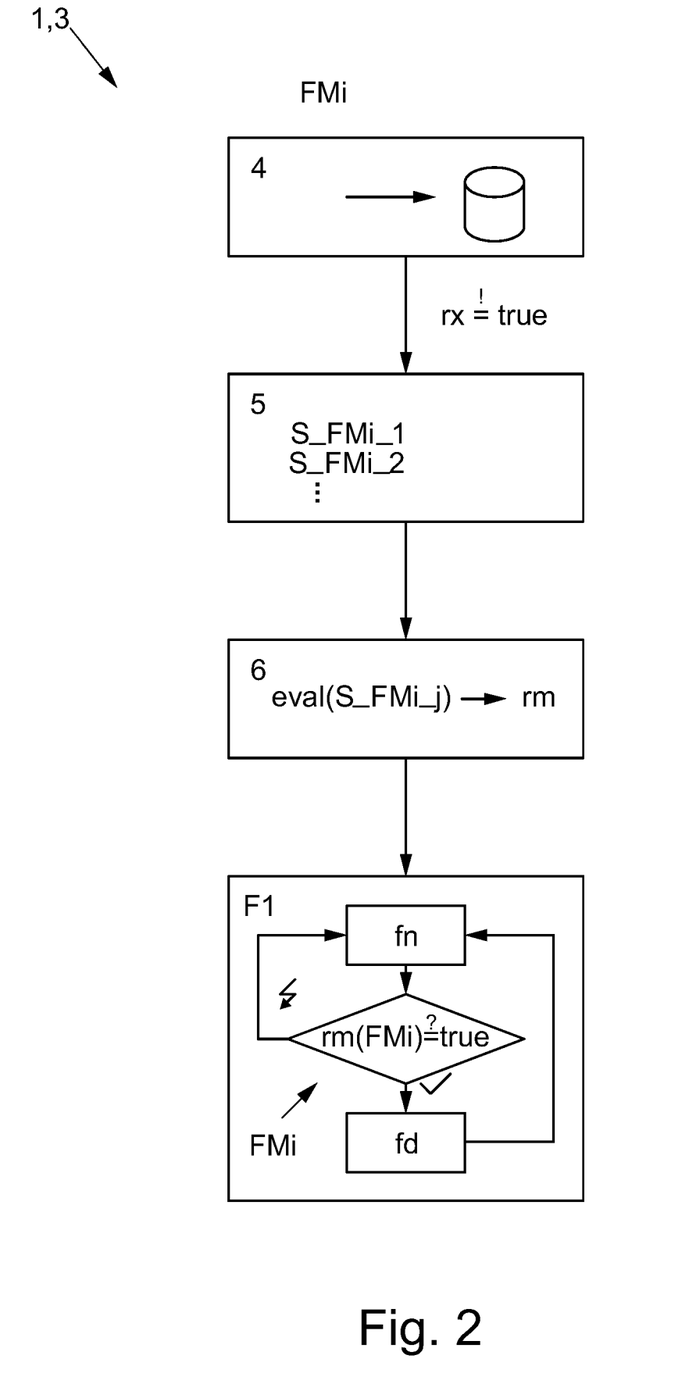
FIG. 2 schematically illustrates the method according to the invention for deriving and applying a message rule, the checking of which triggers the diagnostic mode.

FIG. 2 shows the method 1 in its entirety. In a learning mode 3, at least some of the fieldbus messages FMi are captured and stored 4. Not all fieldbus messages FMi have to be captured and stored 4; a selection of the fieldbus messages FMi can also be captured and stored 4. This ensures that past fieldbus messages FMi can be accessed at any time. It is conceivable, for example, to store a determined number of fieldbus messages FMi according to the principle of a ring buffer, so that this number of past but recent fieldbus messages FMi is always known.

In a plurality of acquisition steps 5, the acquired and stored 4 fieldbus messages FMi are at least partially stored as a learning data set S_FMi when the status rule rx is fulfilled, so that a plurality of learning data sets S_FMi_j, S_FMi_1, S_FMi_2 are captured. This means that various collections of fieldbus messages are available that describe the message situation on the fieldbus 2 before the status rule rx is fulfilled.

In a subsequent evaluation step 6, a message rule rm for changing from normal mode fn of the field device F1 to diagnostic mode fd of the field device F1 is derived by evaluating eval several learning data sets S_FMi_j depending on at least one fieldbus message FMi. In general, it can be said that the derivation of the message rule rm is based on the fact that the fieldbus messages FMi of the learning data sets F_FMi_j are examined for similarities that are associated with the triggering of diagnostic mode or the fulfillment of the status rule rx.

With the derived message rule rm, it is now possible for the field device F1 to apply the message rule rm instead of or in addition to the status rule rx to switch from normal mode fn of the field device F1 to diagnostic mode fd of the field device F1. This is shown in FIG. 2 below. In the case of the field device F1, the status rule rx still used in FIG. 1 has been replaced by the message rule rm, which of course no longer depends on one or more status variables x, but on fieldbus messages FMi. The fieldbus messages FMi can be all fieldbus messages FMi or only a determined selection of fieldbus messages FMi.

Figure 3:
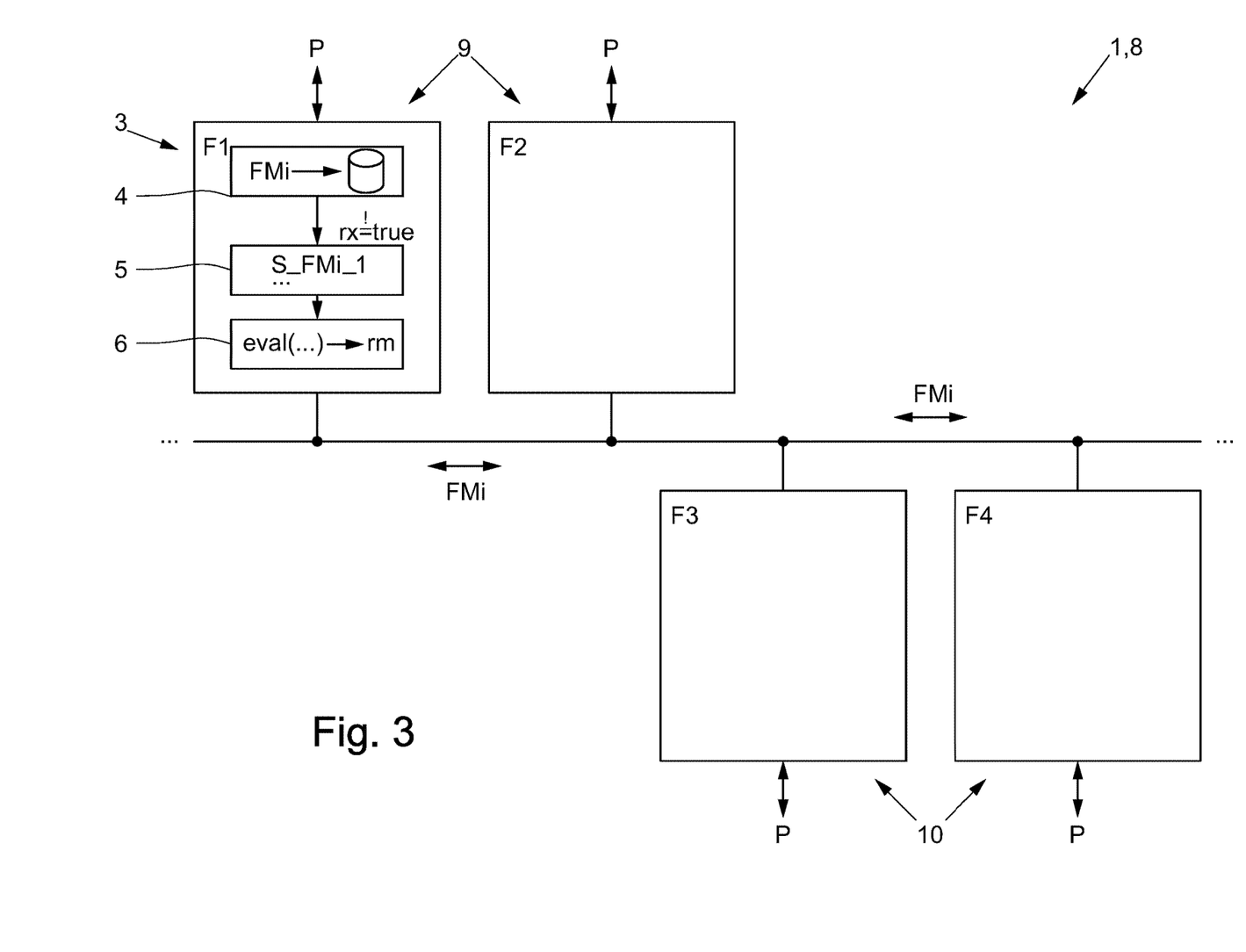
FIG. 3 illustrates a field device arrangement similar to FIG. 1, in which the method for deriving a message rule is performed on a field device.

FIG. 3 shows that in learning mode 3, the fieldbus messages FMi are captured by the field device F1 and the capture steps 5 and the evaluation step 6 are performed on the field device F1. This has the advantage that no additional technical equipment is required to perform the method 1.

Figure 4:
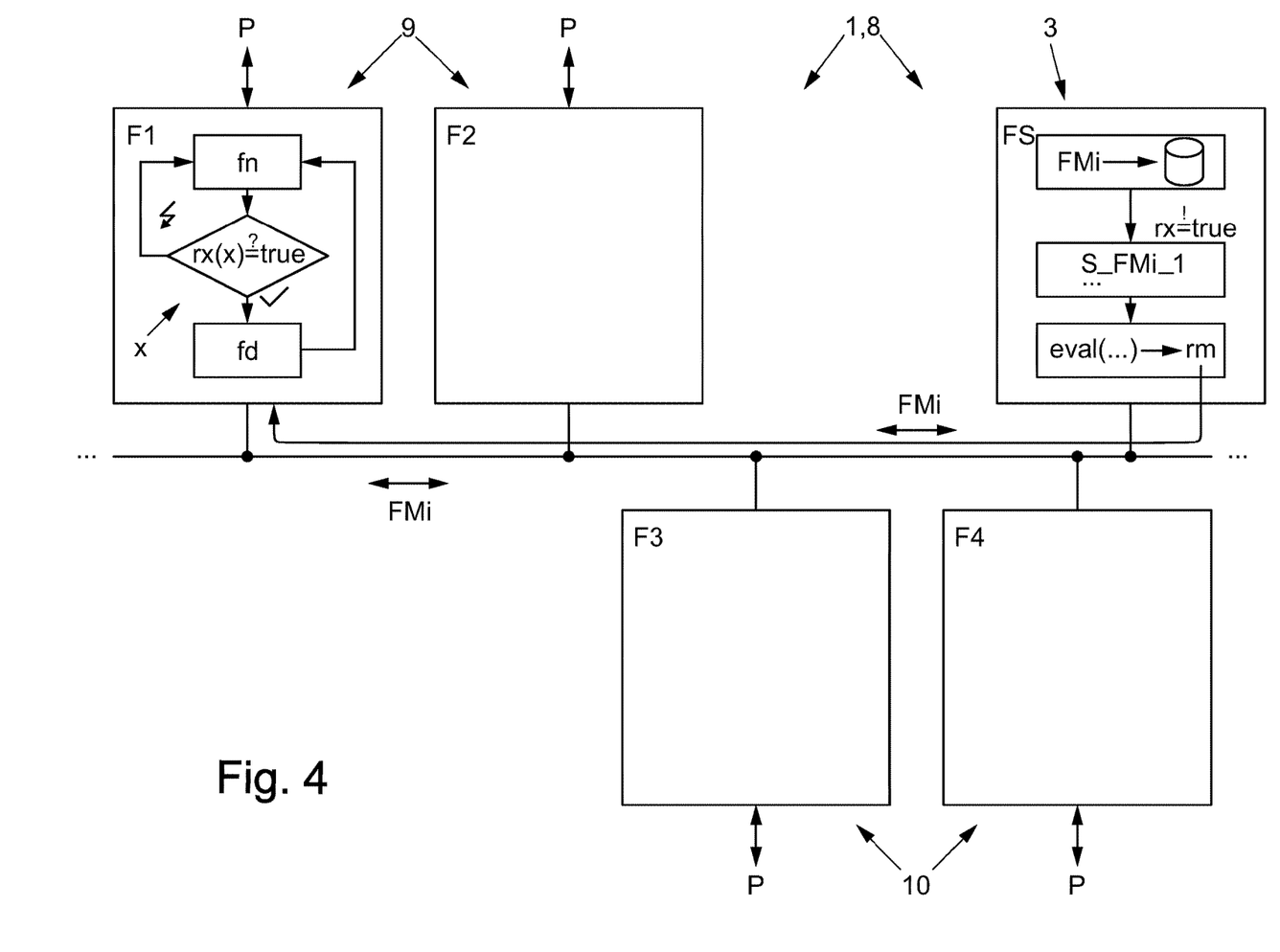
FIG. 4 schematically illustrates an embodiment in which a service bus subscriber is also provided, on which the method for deriving a message rule is performed.

The embodiment according to FIG. 4 shows an alternative procedure. In learning mode 3, the fieldbus messages FMi are captured by a service bus subscriber FS and the capture steps 5 and the evaluation step 6 are performed on the service bus subscriber FS. The service bus subscriber FS is a more powerful computer than the field device F1, so that a higher computing capacity is available for learning mode 3. The field device F1 evaluates the status rule rx and informs the service bus subscriber FS that the status rule rx has been fulfilled (rx=! true), in this case by means of a fieldbus message. In this respect, the service bus subscriber FS has all the information it needs to derive the message rule rm. The service bus subscriber FS then transmits the derived message rule rm to the field device F1, where the message rule rm is applied, as an alternative or in addition to the status rule rx. The status rule rx shown in the field device F1 in FIG. 4 is replaced by the transmitted message rule rm in a subsequent step.

Figure 5:
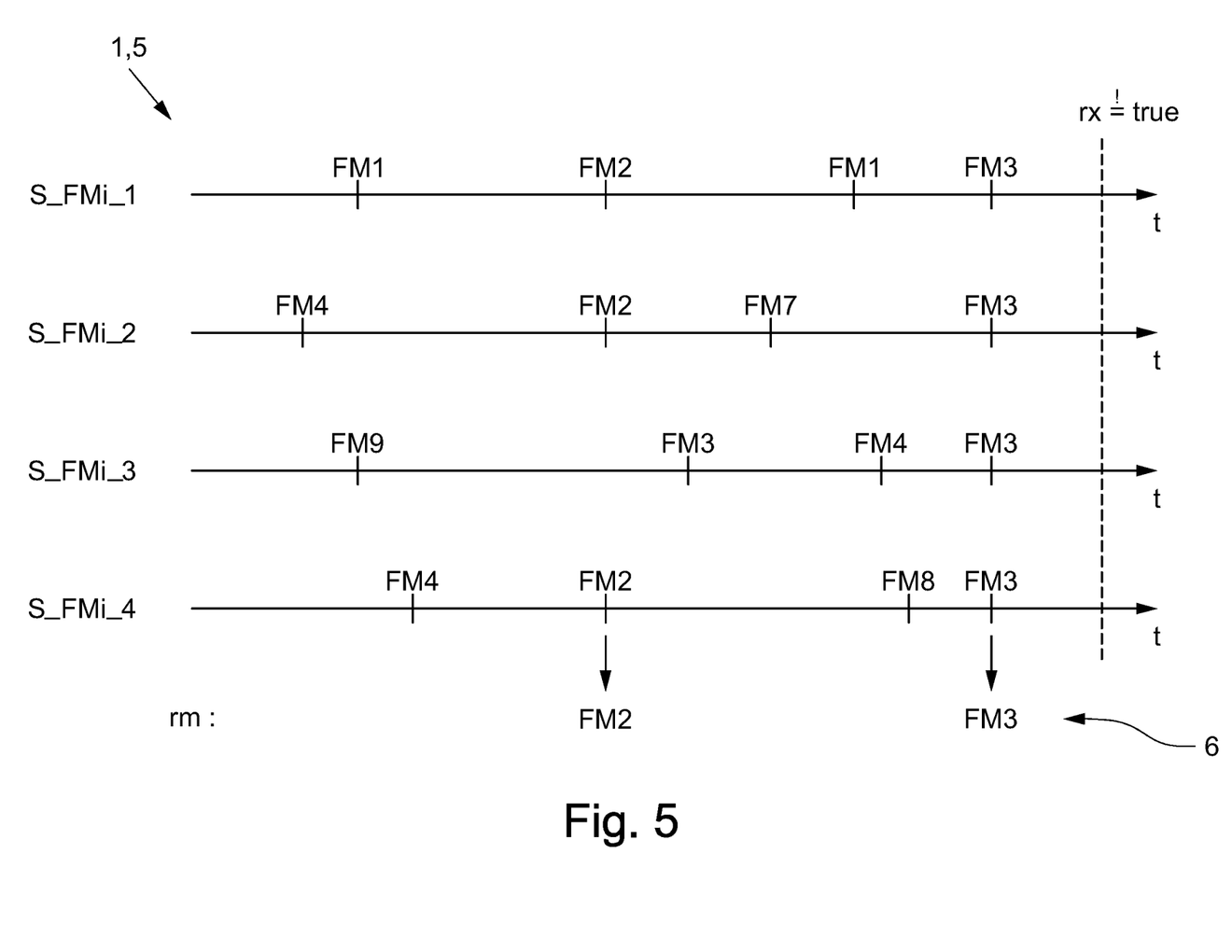
FIG. 5 illustrates several learning data sets with fieldbus messages and the derivation of a message rule.

FIG. 5 shows an example of a plurality of capture steps 5 and the evaluation step 6. A total of four learning data sets S_FMi_1, S_FMi_2, S_FMi_3, S_FMi_4 are shown. The learning data sets S_FMi_j are always created after the status rule rx has been fulfilled (rx(x)=! true). The last four fieldbus messages FMi stored in learning mode 3 are included in the respective learning data set as image rules. The learning data sets S_FMi_j can now be examined for similarities with regard to the occurrence of fieldbus messages FMi. In the embodiment shown in FIG. 5, the examination for similarities has led to the occurrence of the fieldbus messages FM2 and FM3 within the last four captured fieldbus messages FMi being recognized as characteristic for the triggering of diagnostic mode fd (measured by the behaviour of the status rule rx). The dependency is readily apparent in the embodiment shown in FIG. 5. Algorithmically, the evaluation step 6 and thus the derivation of the message rule rm from the learning data sets S_FMi_j can be implemented on the basis of a regression analysis, with the various bus messages FMi as independent variables and the fulfillment of the status rule rx as the dependent variable. In this context, it has proven to be advantageous if the bus messages FMi with the smallest partial correlation to the fulfillment of the status rule rx are sequentially excluded until only a predetermined number of independent variables are part of the message rule rm.

Figure 6:
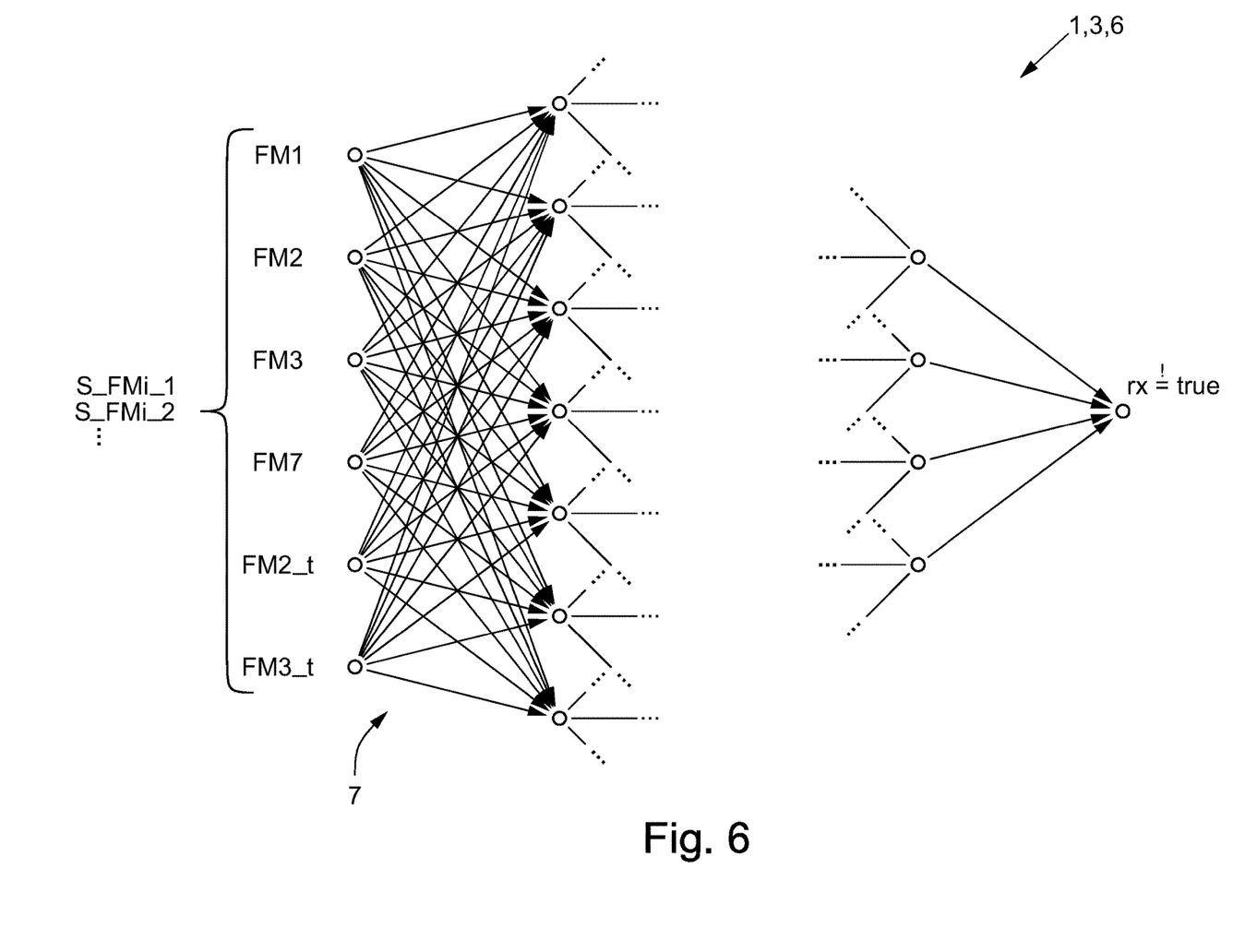
FIG. 6 illustrates the training of a neural network with learning data sets to obtain the message rule.

FIG. 6 shows another embodiment for deriving the message rule rm from the learning data sets S_FMi_j obtained, which is done here on the basis of training an artificial neural network 7. At least some of the bus messages FMi of the learning data sets S_FMi_j are used as input variables and the fulfillment of the status rule rx is used as an output variable. Usually, part of the learning data sets S_FMi_j is used to test the trained artificial neural network 7. It has proven to be advantageous if the relative times FM2_t, FM3_t of the occurrence of the respective bus message FM2, FM3 are at least partially used as input variables, i.e. a temporal reference of the occurrence of the fieldbus messages FMi also plays a role. The trained neural network 7 is then transferred to the field device F1 and calculated there in addition to or instead of the status rule rx.

The method 1 described can be used particularly advantageously in connection with filling systems 8. FIGS. 1, 3 and 4 therefore also schematically illustrate the use of the field device F1 and the further bus participants F2, F3, F4 in such a filling system 8. The field device F1 here is a first flow or fill level sensor F1, the further bus participant F2 is a first filling valve F2, wherein the first flow or fill level sensor F1 and the filling valve F2 together with a first control and evaluation unit, which is not explicitly shown, form a first filling point 9, wherein the first control and evaluation unit serves to control and monitor the filling process of the first filling point 9. The bus participant F3 is a second flow or fill level sensor F3, the further bus participant F4 is a second filling valve F4, wherein the second flow or fill level sensor F3 and the second filling valve F4 together with a second control and evaluation unit, which is also not expressly shown, form a second filling point 10, wherein the second control and evaluation unit serves to control and monitor the filling process of the second filling point 10. In the embodiments shown, the first control and evaluation unit is comprised of the first flow or fill level sensor F1 and the second control and evaluation unit is comprised of the second flow or fill level sensor F3. It is indicated in the figures that the first flow or fill level sensor F1, the second flow or fill level sensor F3, the first filling valve F2 and the second filling valve F4 are in contact with a process P, in this example with the filling process.

The first filling valve F2, the first flow or fill level sensor F1, the second filling valve F4 and the second flow or fill level sensor F3 are in communication with each other via a fieldbus 2. FIGS. 1 and 4 show that the first control and evaluation unit is specified a status rule rx for changing from a normal mode fn of the first flow or fill level sensor F1 to a diagnostic mode fd of the first flow or fill level sensor F1 when the status rule rx is fulfilled. According to the general teaching, the status rule rx depends on at least one status variable x of the first flow or fill level sensor F1 known to the first flow or fill level sensor F1.

The filling systems 8 in FIGS. 1 and 3 are characterized in that the control and evaluation unit of the first filling point 9 is designed in such a way that the control and evaluation unit performs the previously generally described method 1 during operation, i.e. performs a plurality of capture steps 5 and the evaluation step 6 in learning mode 3, and applies the message rule rm derived as a result.

The filling system 8 in FIG. 4, on the other hand, is characterized in that a service bus subscriber FS is connected to the first filling valve F2 and the first flow or fill level sensor F1 of the first filling point 9 and to the second filling valve F4 and the second flow or fill level sensor F3 of the second filling point 10 via the field bus 2 and the filling system 8 performs the method 1 as described above in general in connection with the use of the service bus subscriber FS.

The invention claimed is:

1. A method for operating a field device for process measurement technology, wherein the field device is in communication with at least one other bus subscriber via a field bus for transmitting field bus messages, wherein at least one status rule is specified to the field device for changing from a normal mode of the field device to a diagnostic mode of the field device when the status rule is fulfilled, wherein the status rule depends on at least one status variable of the field device known to the field device, the method comprising:

capturing and storing at least some of the fieldbus messages in a learning mode;

in a plurality of capture steps, at least partially storing the captured and stored fieldbus messages as a learning data set in each case if the status rule is fulfilled, so that a plurality of learning data sets are captured;

in an evaluation step, evaluating a plurality of learning data sets to derive a message rule dependent on at least one fieldbus message for changing from normal mode of the field device to diagnostic mode of the field device; and applying, by the field device, the message rule for changing from the normal mode of the field device to the diagnostic mode of the field device instead of or in addition to the status rule.

2. The method according to claim 1, wherein in the learning mode the fieldbus messages are captured by the field device and the plurality of capture steps and the evaluation step are performed on the field device.

3. The method according to claim 1, wherein in learning mode the field bus messages are captured by a service bus subscriber and the plurality of capture steps and the evaluation step are performed on the service bus subscriber; and
wherein the field device evaluates the status rule and communicates the fulfilment of the status rule to the service bus subscriber, by means of a field bus message.

4. The method according to claim 3, wherein the service bus subscriber transmits the message rule to the field device and the message rule is applied at the field device.

5. The method according to claim 4, wherein the message rule is derived in the evaluation step from the learning data sets on the basis of a regression analysis, with the various bus messages as independent variables and the fulfilment of the status rule as the dependent variable.

6. The method according to claim 5, wherein the bus messages with a smallest partial correlation in the fulfilment of the status rule are sequentially excluded until only a predetermined number of independent variables are still part of the message rule.

7. The method according to claim 1, wherein, in the evaluation step, the message rule is derived from the learning data sets on the basis of training an artificial neural network, with at least some of the bus messages of the learning data sets as input variables and the fulfillment of the status rule as output variable; and
wherein the relative time of the occurrence of the respective bus message is also used at least partially as input variable.

8. The method according to claim 1, wherein, in the plurality of capture steps, such field bus messages are stored in a learning data set which were not addressed to the field device itself.

9. A filling system, comprising:
a first filling point; and
at least one second filling point;
wherein the first filling point has at least one first filling valve, at least one first flow or fill level sensor and at least one first control and evaluation unit for controlling and monitoring the filling process of the first filling point; and
wherein the second filling point has at least one second filling valve, at least one second flow or fill level sensor and at least one second control and evaluation unit for controlling and monitoring the filling process of the second filling point;
wherein the first filling valve, the first flow or fill level sensor, the second filling valve and the second flow or fill level sensor are in communication with each other via a field bus;
wherein at least the first control and evaluation unit is provided a status rule for changing from a normal mode of the first flow or fill level sensor to a diagnostic mode of the first flow or fill level sensor when the status rule is fulfilled;
wherein the status rule depends on at least one status variable of the first flow or fill level sensor known to the first flow or fill level sensor;
wherein the control and evaluation unit of at least the first filling point is designed in such a way that during operation the control and evaluation unit performs a method including the following steps:
capturing and storing at least some of the fieldbus messages in a learning mode;
in a plurality of capture steps, at least partially storing the captured and stored fieldbus messages as a learning data set in each case if the status rule is fulfilled, so that a plurality of learning data sets are captured;
in an evaluation step, evaluating a plurality of learning data sets to derive a message rule dependent on at least one fieldbus message for changing from normal mode of the field device to diagnostic mode of the field device; and
applying, by the field device, the message rule for changing from the normal mode of the field device to the diagnostic mode of the field device instead of or in addition to the status rule.

10. A filling system, comprising:
a first filling point; and
at least one second filling point;
wherein the first filling point has at least one first filling valve, at least one first flow or fill level sensor and at least one first control and evaluation unit for controlling and monitoring the filling process of the first filling point; and
wherein the second filling point has at least one second filling valve, at least one second flow or fill level sensor and at least one second control and evaluation unit for controlling and monitoring the filling process of the second filling point;
wherein the first filling valve, the first flow or fill level sensor, the second filling valve and the second flow or fill level sensor are in communication with each other via a field bus;
wherein at least the first control and evaluation unit is provided a status rule for changing from a normal mode of the first flow or fill level sensor to a diagnostic mode of the first flow or fill level sensor when the status rule is fulfilled;
wherein the status rule depends on at least one status variable of the first flow or fill level sensor known to the first flow or fill level sensor; and
wherein a service bus subscriber is connected to the first filling valve and the first flow or fill level sensor of the first filling point and to the second filling valve and the second flow or fill level sensor of the second filling point via the field bus.

11. The filling system of claim 10, wherein the filling system is configured to perform a method including the steps of:
capturing and storing at least some of the fieldbus messages in a learning mode;
in a plurality of capture steps, at least partially storing the captured and stored fieldbus messages as a learning data set in each case if the status rule is fulfilled, so that a plurality of learning data sets are captured;
in an evaluation step, evaluating a plurality of learning data sets to derive a message rule dependent on at least one fieldbus message for changing from normal mode of the field device to diagnostic mode of the field device; and
applying, by the field device, the message rule for changing from the normal mode of the field device to the diagnostic mode of the field device instead of or in addition to the status rule.

12. The filling system of claim 11, wherein the filling system is configured such that at least one of:
in the learning mode the fieldbus messages are captured by the field device and the plurality of capture steps and the evaluation step are performed on the field device;
in learning mode the field bus messages are captured by a service bus subscriber and the plurality of capture steps and the evaluation step are performed on the service bus subscriber, and the field device evaluates the status rule and communicates the fulfilment of the status rule to the service bus subscriber, by means of a field bus message;

the service bus subscriber transmits the message rule to the field device and the message rule is applied at the field device;

the message rule is derived in the evaluation step from the learning data sets on the basis of a regression analysis, with the various bus messages as independent variables and the fulfilment of the status rule as the dependent variable;

the bus messages with a smallest partial correlation in the fulfilment of the status rule are sequentially excluded until only a predetermined number of independent variables are still part of the message rule;

in the evaluation step, the message rule is derived from the learning data sets on the basis of training an artificial neural network, with at least some of the bus messages of the learning data sets as input variables and the fulfillment of the status rule as output variable, and the relative time of the occurrence of the respective bus message is also used at least partially as input variable; and in the plurality of capture steps, such field bus messages are stored in a learning data set which were not addressed to the field device itself.

* * * * *